United States Patent
Lynen et al.

(10) Patent No.: US 9,695,089 B2
(45) Date of Patent: Jul. 4, 2017

(54) METHOD FOR THE PRODUCTION OF SHAPED ARTICLES FROM REACTION-BONDED, SILICON-INFILTRATED SILICON CARBIDE AND/OR BORON CARBIDE AND THUS PRODUCED SHAPED BODY

(71) Applicant: Schunk Ingenieurkeramik GmbH, Willich-Münchheide (DE)

(72) Inventors: Arthur Lynen, Willich (DE); Jens Larsen, Viersen (DE); Michael Clemens, Bedburg (DE)

(73) Assignee: Schunk Ingenieurkeramik GmbH, Willich-Münchheide (DE)

( * ) Notice: Subject to any disclaimer, the term of this patent is extended or adjusted under 35 U.S.C. 154(b) by 0 days.

(21) Appl. No.: 15/029,334

(22) PCT Filed: Aug. 6, 2014

(86) PCT No.: PCT/EP2014/002157
§ 371 (c)(1),
(2) Date: Apr. 14, 2016

(87) PCT Pub. No.: WO2015/055264
PCT Pub. Date: Apr. 23, 2015

(65) Prior Publication Data
US 2016/0272548 A1    Sep. 22, 2016

(30) Foreign Application Priority Data
Oct. 16, 2013 (DE) .................. 10 2013 017 193

(51) Int. Cl.
C04B 35/565 (2006.01)
C04B 38/00 (2006.01)
(Continued)

(52) U.S. Cl.
CPC .......... C04B 38/0038 (2013.01); B28B 1/001 (2013.01); B32B 18/00 (2013.01);
(Continued)

(58) Field of Classification Search
CPC ........................... C04B 35/565; C04B 35/573
See application file for complete search history.

(56) References Cited

U.S. PATENT DOCUMENTS 6,183,515 B1   2/2001 Barlow et al.
2001/0026868 A1   10/2001 Hanzawa et al.
(Continued)

FOREIGN PATENT DOCUMENTS

| DE | 4243864 A1 | 1/1993 |
| DE | 102005003197 A1 | 3/2006 |
| EP | 1284251 A1 | 2/2003 |

OTHER PUBLICATIONS

International Search Report corresponding to PCT/EP2014/002157 dated Mar. 30, 2015.
(Continued)

*Primary Examiner* — Noah Wiese
(74) *Attorney, Agent, or Firm* — Kilpatrick Townsend & Stockton LLP

(57) ABSTRACT

Method for producing shaped bodies from reaction-bonded, silicon-infiltrated silicon carbide and/or boron carbide, characterized in that a monolithic preliminary body is built up in layers using a formless granulation to which a physical or chemical hardening or melt process is applied, wherein the granulation has a weight fraction of at least 95% silicon carbide and/or boron carbide with an average grain size of 70 to 200 μm, the so-created preliminary body is impregnated at least once by the introduction of a carbon black suspension or via a gas-phase separation and secondary silicon carbide is created in contact with liquid or gaseous
(Continued)

silicon by a subsequent reaction firing that solidifies an engagement composite produced.

12 Claims, 2 Drawing Sheets

(51) Int. Cl.
| | |
|---|---|
| B32B 18/00 | (2006.01) |
| C04B 35/14 | (2006.01) |
| C04B 35/18 | (2006.01) |
| C04B 35/486 | (2006.01) |
| C04B 35/563 | (2006.01) |
| C04B 35/626 | (2006.01) |
| B28B 1/00 | (2006.01) |
| B33Y 10/00 | (2015.01) |
| B33Y 80/00 | (2015.01) |

(52) U.S. Cl.
CPC .............. *C04B 35/14* (2013.01); *C04B 35/18* (2013.01); *C04B 35/486* (2013.01); *C04B 35/563* (2013.01); *C04B 35/565* (2013.01); *C04B 35/6269* (2013.01); *C04B 38/0096* (2013.01); *B33Y 10/00* (2014.12); *B33Y 80/00* (2014.12); *C04B 2235/424* (2013.01); *C04B 2235/428* (2013.01); *C04B 2235/5427* (2013.01); *C04B 2235/6026* (2013.01); *C04B 2235/614* (2013.01); *C04B 2235/616* (2013.01); *C04B 2237/341* (2013.01); *C04B 2237/348* (2013.01); *C04B 2237/36* (2013.01); *C04B 2237/365* (2013.01); *C04B 2237/61* (2013.01)

(56) References Cited

U.S. PATENT DOCUMENTS

| | | | |
|---|---|---|---|
| 2006/0035024 A1* | 2/2006 | Landini | ................ C04B 35/806 427/249.2 |
| 2010/0279007 A1* | 11/2010 | Briselden | ................ B22F 3/008 427/243 |
| 2013/0157013 A1* | 6/2013 | Huson | ...................... B28B 1/00 428/156 |

OTHER PUBLICATIONS

English translation of International Preliminary Report on Patentability corresponding to PCT/EP2014/002157 dated Apr. 19, 2016.

* cited by examiner

METHOD FOR THE PRODUCTION OF SHAPED ARTICLES FROM REACTION-BONDED, SILICON-INFILTRATED SILICON CARBIDE AND/OR BORON CARBIDE AND THUS PRODUCED SHAPED BODY

BACKGROUND OF THE INVENTION

1. Field of the Invention

The invention relates to a method for producing shaped articles from reaction-bonded, silicon-infiltrated silicon carbide and/or boron carbide according to the preamble of claim 1 and a shaped article thus produced according to claim 9.

2. Background Art

Known from DE 42 43 864 C2 is a method for the producing of shaped articles from reaction-bonded, silicon-infiltrated silicon carbide in which an appropriate slurry is produced and is cast in a mould to form a green body. The green body is then dried and, after the drying, heated in contact with liquid or gaseous silicon. This casting method is however complex or not applicable when large shaped articles, shaped articles with undercuttings or shaped articles with highly differing wall thicknesses are to be produced. Such shaped articles are therefore put together by elaborately combining several parts. Apart from the effort required, the joints continually cause problems in the processing and durability.

From DE 10 2005 003 197 B4 is known a method in which a slurry is also used for the production of shaped articles from reaction-bonded, silicon-infiltrated silicon carbide is well known. The slurry is made from fine-grain silicon carbide, colloidal carbon, additives and a liquid medium. The slurry together with a fibrous textile material with a carbon residue of at least 50% after pyrolysis is formed in a layered way. In this, the textile material prevents crumbling of the drying and therefore shrinking, slurry. In addition, a uniform reaction-bonded, silicon-infiltrated silicon carbide body can be produced by heating at a later date.

Further, from EP 1 284 251 B1 is known to produce a porous and correspondingly lightweight and structured ceramic material based on silicon carbide in which a framework with a porous structure such as corrugated cardboard or a fabric is impregnated with a slurry made from a resin as carbon source, and a powdered silicon is carbonised to react with the silicon, and then is infiltrated with the liquid silicon in order to close the pores formed by the reaction of the silicon with the carbon, but to maintain the structure of the framework i.e. roughly the structure of the corrugated cardboard or of the fabric. Such fibre-reinforced silicon carbide composites are suitable for applications that require an improved toughness. The silicon carbide composites obtained are however only simple, dense fibre-reinforced shaped articles.

SUMMARY OF THE INVENTION

It is after all known that the formation of larger and more complex ceramic components is essentially limited to casting processes, namely by means of slurries in slip casting or with ceramic, hydraulic or chemically bonded casting compounds in shaking or vibration casting. The common factor in these casting methods is that the ceramic powder and grainings in terms of obtaining the highest possible packing density are available in broad or multi-modal distributions and as dispersions, mostly aqueous. The transition from more or less liquid into the formed state takes place via capillary forces, sometimes supported by hydraulic or chemical binding. It is only when the dispersion medium is extracted, mostly on dehydration by drying, that a further solidification occurs, producing workable blanks. The loss of dispersion medium is mostly combined with shrinking of the blank, which can lead to cracks dependent on component size, complexity and material/wall thickness.

The object of the invention is therefore to provide an improved method for the manufacture of a shaped article from reaction-bonded, silicon-infiltrated silicon carbide and/or boron carbide and to create such a shaped article which also allows a geometrical freedom in the manufacture of the shaped articles.

This object is solved by the features of the claims 1 and 9.

By this, a method for the production of a shaped article from reaction-bonded, silicon-infiltrated silicon carbide and/or boron carbide silicon and a such produced shaped body is created that allows geometrical freedom. By using procedures that construct a preliminary body in layers out of a shapeless granulation through the use of physical and/or chemical binding agents, shaped articles with large and/or complex forms can be manufactured based on design data. This means that undercuts are possible, something that ceramic moulding methods cannot achieve, or only by the combination of various shaped articles. It is then possible to create the preliminary body in a very short time.

Existing CAD data can without moulds be converted directly and rapidly into components, workpieces or other shaped articles.

The method according to the invention is designed with at least two steps: by constructing the preliminary body in layers first. The graining of a primary material used therefore, here silicon carbide and/or boron carbide, provides the highest possible packing density with a porosity that allows the introduction of colloidal carbon or carbon black or the deposition of carbon in such a way that pore space formed by the porosity is filled with secondary silicon carbide and possibly silicon due to a reaction firing and the preliminary body is solidified to a shaped article.

In the method according to the invention the dimensions also remain unchanged, in contrast to the slurry casting method, when during shaping out of a grain bulk a solidified, workable, porous preliminary body is created and its porosity is then filled by impregnation or chemical vapour deposition, even when the dispersion medium is extracted in the case of impregnation. This can avoid cracks, especially when removing the blank from large, complex moulds.

According to the invention, a solidified shaped article is therefore produced and the resulting secondary silicon carbide already supplies a stabilising effect during the firing and also in combination with the primary material by the positioning in the pore space of the preliminary body, where carbon can be introduced in a selectable quantity. The (newly formed) secondary silicon carbide thus defines the microstructure of the shaped article, being verified by electron microscope investigations.

BRIEF DESCRIPTION OF THE DRAWINGS

Further embodiments of the invention can be taken from the following description and from the dependent claims.

The invention will be explained in more detail below by means of the embodiment examples shown in the attached figures.

DESCRIPTION OF THE SPECIFIC EMBODIMENTS

The invention relates to a method for the production of shaped articles made from reaction-bonded, silicon-infiltrated silicon carbide and/or boron carbide.

A preliminary body is constructed monolithically in layers from a formless granulation by the use of a physical or chemical hardening or melting process. In that, the granulation has a weight fraction of at least 95% silicon carbide and/or boron carbide with an average grain size of 70 to 200 µm. The preliminary body so constructed is impregnated at least once in a carbon black suspension or carbon is introduced via a chemical vapour deposition.

In contact with liquid or gaseous silicon, a reaction fire then occurs in which secondary carbide is formed that solidifies the resulting infiltrated composite.

This allows to pattern undercut geometries monolithically at all.

Figure 1:
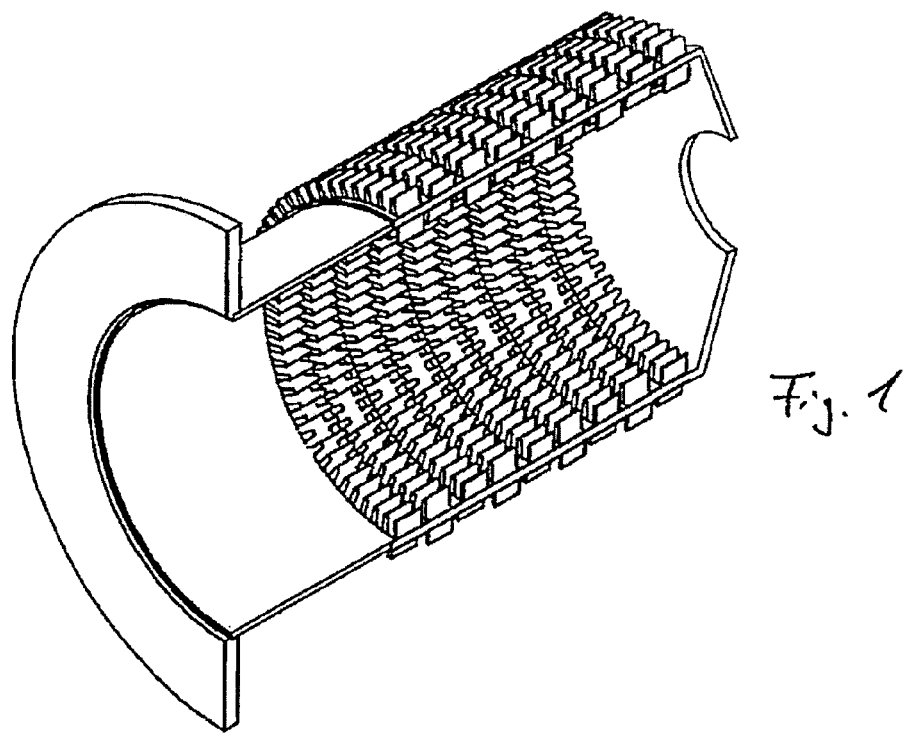
FIG. 1 shows schematically and partly in section a side view of a hollow ceramic body.
Figure 2:
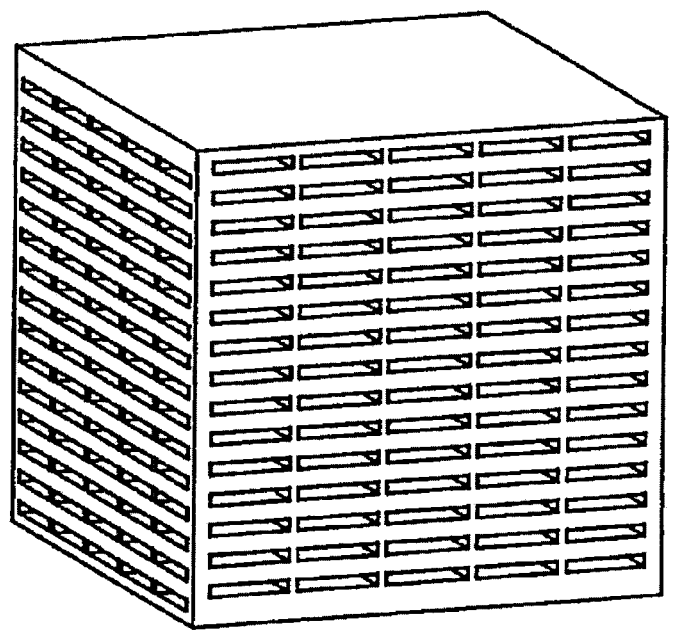
FIG. 2 shows schematically a side view of a ceramic body with undercuts.

FIG. 1 and FIG. 2 show a hollow ceramic body and a ceramic body with undercuts that can be used, for example, as heat exchanger structures. Such components can be manufactured from one piece using the method described without any further production steps such as joining or material removal by milling or drilling. There are accordingly no joints present in the finished component.

Figure 3:
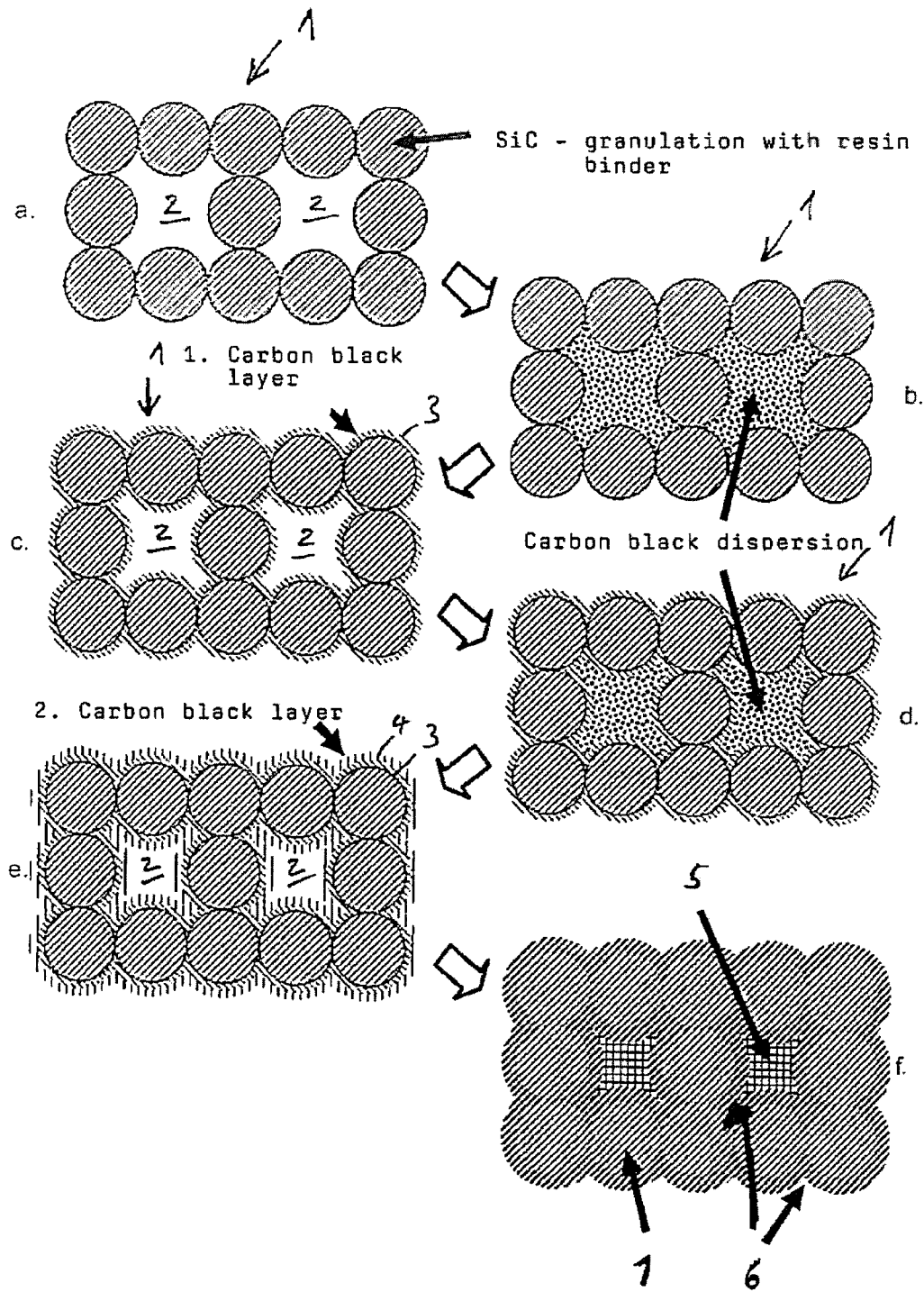
FIG. 3 shows schematically a method sequence for the production of a part of a shaped article made from SiSiC by multiple impregnation of a porous SIC preliminary body with a carbon black suspension and a subsequent silicon infiltration.

The method according to the invention has at least two steps and includes the making of a preliminary body. Because of the grain filling used, a porous preliminary body is made. FIG. 3 shows as illustration a. a part of such a preliminary body. By using granulations with an average grain size of 70 to 200 µm and suitable binding agent, a porosity is reached that allows a complete impregnation with dispersions based on nano powders. The possible alternative is the introduction of carbon by separation from the gas phase using CVD (Chemical Vapour Deposition). With multiple impregnation or separation from the gas phase, sufficient pore space 2 should remain free in each of the treatments described above to allow through-flow, as illustrations b. to d. shown in FIG. 3.

As the method according to the invention is in particularly suited to the manufacture of components using silicon-infiltrated silicon carbide, the embodiment refers to this material.

A preliminary body is built up layer-by-layer from for example a silicon carbide grain 100/F, known as a technical, refractory ceramics, whose grain size distribution can be described by the values:

d 10: 75 µm
d 50: 115 µm
d 90: 160 µm and a binding agent, preferably furan resin. The so constructed preliminary body possesses a porosity that essentially comprises only open pores, the pore space, as illustration a. shown in FIG. 3. The porosity is around 47 vol. % with a 43 µm median pore size distribution. The illustration a. in FIG. 3 is therefore described as SiC granulation with resin bonding.

This preliminary body is then impregnated with an aqueous carbon black suspension, as shown in illustration b. of FIG. 3. The carbon black suspension contains 30 wt. % carbon black and also contains a surface-active agent, in addition to the polyelectrolyte-based dispersion agent.

The surface-active agent causes that the carbon black suspension 7 when drying is applied on the grains of the porous preliminary body of SiC or its structure as a first carbon black layer 3 as shown in illustration c. of FIG. 3, and not coagulates in pore space 2. This ensures that sufficient through-flow pore space 2 remains available, even when impregnated several times, as shown in illustration d. together with illustration b. of FIG. 3. This is shown in illustration e. of FIG. 3 by means of a second carbon black layer 4 that is applied to the first carbon black layer 3 and leaves a residual pore space 2 free for through flow. This is a precondition for the subsequent reaction firing with infiltrated silicon 5 that penetrates into the remaining pore space 2 to create secondary SiC 6 with regard to the primary SiC of grain 1—as shown in illustration f. of FIG. 3.

After, for example only one impregnation of the preliminary body, the ratio of silicon carbide/carbon may be 87/13, after two impregnations 79/21 and after three impregnations 76/24.

The present multiple impregnation (namely twice) of the preliminary body with a carbon black suspension is transferred into silicon-infiltrated silicon carbide (SiSlC) by means of a reaction firing creating secondary SiC 6 that strengthens the infiltrated composite as shown in illustration f. of FIG. 3. In this, liquid silicon at a temperature above 1400° C. penetrates into the remaining open pores or the pore space 2.

The carbon is necessary to ensure a sufficient wetting of the primary SiC with liquid silicon. In addition, the carbon creates during in the reaction firing, together with the silicon, secondary silicon carbide 6 that causes to a solidification of the infiltrated composite, already desired during the firing itself, having a stabilising effect.

The volumetric fraction and the grain distribution of the primary silicon carbide in the siliconised shaped body correspond preferably and essentially to the silicon carbide granulation in the preliminary body.

The original pore space 2 of the preliminary body before the impregnation with carbon black corresponds in the siliconised state preferably to the volume of secondary silicon carbide 6 and silicon 5. The ratio of secondary silicon carbide 6 to silicon 5, as shown in the illustration f. of FIG. 3, depends here on the carbon black content in the preliminary body. With low carbon black content, it is almost exclusively silicon 5 (not shown) that is present, in addition to the primary grain of granulation 1. With increasing carbon black content, the fraction of secondary silicon carbide 6 rises, as shown in the illustration f. of FIG. 3. This newly-created, secondary silicon carbide 6 and the primary silicon carbide of granulation 1 can be distinguished for example using a scanning electron microscope, as described in the article by J. N. Ness, T. F. Page, Microstructural evolution in reaction-bonded silicon carbide, Journal of Materials Science 21 (1986), 1377-1397.

The currently used siliconization methods are add-on, wick and immersion impregnation. The distance between silicon source and preliminary body material to be processed should not be greater than 150-200 mm with regard to a complete infiltration. In add-on impregnation, silicon-filled SiSiC shells or silicon briquettes, so-called feeders, are used which require to be laid as a horizontal layer on the preliminary body. For the immersion impregnation in a silicon melt, graphite crucibles are required being large enough to pick up the complete preliminary body. Voluminous and/or complex preliminary bodies manufactured typically with the method described here can, if necessary, only be siliconised if the silicon source is also produced as a complex, adapted form piece. The method according to the invention is also suitable for this, where again silicon granulate with grain size 70 to 200 µm is used.

An alternative method for introducing the carbon is its deposition from the gas phase.

The following generally applies in the invention, regardless of the embodiment described above:

To harden the preliminary body built up in layers, a binding agent such as a selectable resin can be used.

The preliminary body can be built up by a 3D printer on the basis of design data using a laser printer method or the multi-jet-modelling method. Specified dimensions and shapes of a CAD body can serve as design data. The building up in layers of the preliminary body can take place in layer thicknesses of 100 to 500 µm. The preliminary body has a porosity of at least 40 vol. % before the impregnation or gas-phase separation and has a median pore size distribution of at least 40 µm. An aqueous carbon black suspension with a selectable surface-active agent can be used as carbon black suspension so that the suspension applies onto the grains inside the preliminary body during drying. If the impregnation takes place using a suspension, the preliminary body is preferably dehydrated by drying before the reaction firing is carried out.

The preliminary body can be impregnated several times with the carbon black suspension, in particular two to four times.

Using the method according to the invention, a shaped body of silicon and/or boron carbide with pores filled by infiltrated silicon can be produced.

An existing pore space in the preliminary body before the impregnation or gas-phase separation corresponds preferably in the siliconised state to a volume of secondary silicon carbide and silicon. The ratio of secondary silicon carbide to silicon can be adjusted via the carbon black content of the preliminary body.

With this method, not only can silicon carbide and/or boron carbide be made; ceramics based on aluminium oxide/silicate, zirconium oxide, fused silica etc. or oxide ceramic are also possible. For this, an appropriate preliminary body of suitable raw materials whose grain sizes are comparable, can be built up in layers using 3D printing, for example. For the oxide, inorganic binders are preferred instead of a resin, the post-impregnation takes place using pyrogenically produced, aqueous, dispersed oxidic nano powders. This is, for example, pyrogenic silica (e.g. Aerosil) or pyrogenic aluminium oxide (e.g. Aeroxide).

It then concerns here a method for manufacturing shaped bodies using an oxide ceramic wherein a monolithic preliminary body is built up in layers from a formless granulation using a physical or chemical hardening or melt process. The granulation in this case has an average grain size of 70 to 200 µm and the so-constructed preliminary body will be impregnated at least once with pyrogenically produced, aqueous dispersed, oxidic nano powders for the strengthening of the so-created engagement composite.

The invention claimed is:

1. Method for producing shaped bodies from reaction-bonded, silicon-infiltrated silicon carbide and/or boron carbide, wherein a monolithic preliminary body is built up in layers using a formless granulation to which a physical or chemical hardening or melt process is applied, wherein the granulation has a weight fraction of at least 95% silicon carbide and/or boron carbide with an average grain size of 70 to 200 µm, the so-created preliminary body is impregnated at least once by the introduction of a carbon black suspension or via a gas-phase deposition and then placing in contact with liquid or gaseous silicon such that secondary silicon carbide is created by a subsequent reaction firing that solidifies an infiltrated composite produced, wherein the preliminary body has a porosity before the impregnation or gas-phase deposition of at least 40 vol. % with a median value of pore size distribution of at least 40 µm.

2. Method according to claim 1, wherein a binding agent such as a resin is used.

3. Method according to claim 1, wherein the preliminary body is built up from design data by means of a 3D printer that works on the laser printing or multi-jet-modelling principle.

4. Method according to claim 3, wherein the specified dimensions and shapes of a CAD body are used as design data.

5. Method according to claim 1, wherein the building up of the preliminary body is done using layer thicknesses of 100 to 500 µm.

6. Method according to claim 1, wherein an aqueous carbon black suspension with a surface-active agent is used as carbon black suspension so that the suspension is applied onto the grains of the preliminary body during drying.

7. Method according to claim 1, wherein the preliminary body is impregnated several times with the carbon black suspension.

8. Shaped article in silicon carbide and/or boron carbide with pores filled by infiltrated silicon, obtained by a method according to claim 1.

9. Shaped article according to claim 8, wherein a pore space in the preliminary body existing before the impregnation or gas-phase separation corresponds in the siliconized state to a volume of secondary silicon carbide and silicon.

10. Shaped article according to claim 9, wherein the ratio of secondary silicon carbide to silicon can be adjusted by the carbon black content in the preliminary body.

11. Method for producing shaped bodies from reaction-bonded, silicon-infiltrated silicon carbide and/or boron carbide, wherein a monolithic preliminary body is built up in layers using a formless granulation to which a physical or chemical hardening or melt process is applied, wherein the granulation has a weight fraction of at least 95% silicon carbide and/or boron carbide with an average grain size of 70 to 200 µm, the so-created preliminary body is impregnated at least once by the introduction of a carbon black suspension or via a gas-phase deposition and then placing in contact with liquid or gaseous silicon such that secondary silicon carbide is created by a subsequent reaction firing that solidifies an infiltrated composite produced, wherein an aqueous carbon black suspension with a surface-active agent is used as carbon black suspension so that the suspension is applied onto the grains of the preliminary body during drying.

12. Method for producing shaped bodies from reaction-bonded, silicon-infiltrated silicon carbide and/or boron carbide, wherein a monolithic preliminary body is built up in layers using a formless granulation to which a physical or chemical hardening or melt process is applied, wherein the granulation has a weight fraction of at least 95% silicon carbide and/or boron carbide with an average grain size of 70 to 200 μm, the so-created preliminary body is impregnated at least once by the introduction of a carbon black suspension or via a gas-phase deposition and then placing in contact with liquid or gaseous silicon such that secondary silicon carbide is created by a subsequent reaction firing that solidifies an infiltrated composite produced, wherein the preliminary body is impregnated several times with the carbon black suspension.

* * * * *